United States Patent [19]

Sasano et al.

[11] Patent Number: 5,478,897
[45] Date of Patent: Dec. 26, 1995

[54] POLYURETHANE ADHESIVE COMPOSITIONS

[75] Inventors: Shigetoshi Sasano, Suita; Teruo Hori, Kawanishi; Kyuya Yamazaki, Ibaraki, all of Japan

[73] Assignee: Takeda Chemical Industries, Ltd., Osaka, Japan

[21] Appl. No.: 228,856

[22] Filed: Apr. 18, 1994

[30] Foreign Application Priority Data

Apr. 26, 1993 [JP] Japan .................................. 5-099209

[51] Int. Cl.⁶ .............................. C08L 63/02; C10B 1/00
[52] U.S. Cl. .......................... 525/453; 202/105; 525/111; 525/423; 525/438; 525/454; 525/509; 525/528; 528/51; 528/53; 528/72
[58] Field of Search ..................... 525/111, 423, 525/454, 509, 528, 453, 438; 528/72, 51, 53; 202/105

[56] References Cited

U.S. PATENT DOCUMENTS

| | | | |
|---|---|---|---|
| 4,507,447 | 3/1985 | Yamazaki et al. | 525/528 |
| 4,654,409 | 3/1987 | Shirai et al. | 528/26 |
| 4,870,142 | 9/1989 | Czerwinski et al. | 525/528 |
| 5,096,980 | 3/1992 | Yamazaki et al. | 525/438 |
| 5,202,391 | 4/1993 | Yamazaki et al. | 525/438 |

FOREIGN PATENT DOCUMENTS 61-209282 9/1986 Japan .

*Primary Examiner*—Nathan M. Nutter
*Assistant Examiner*—John M. Cooney, Jr.
*Attorney, Agent, or Firm*—Wenderoth, Lind & Ponack

[57] ABSTRACT

A polyurethane adhesive composition prepared by incorporating phosphorus oxy acid or a derivative thereof, an amine compound and an epoxy resin into an organic polyisocyanate and an organic polyol.

The polyurethane adhesive composition is employed in the manufacture of composite films by lamination of various plastic films, metal foils and so forth. The composition is excellent in adhesive properties, acid resistance and hot water resistance.

12 Claims, No Drawings

POLYURETHANE ADHESIVE COMPOSITIONS

FIELD OF THE INVENTION

This invention relates to a polyurethane adhesive composition excellent in acid resistance and hot water resistance. More specifically, it relates to a polyurethane adhesive composition useful in the manufacture of composite films by lamination of various plastic films, metal foils and so forth, and which is excellent in adhesive properties, acid resistance and hot water resistance.

BACKGROUND OF THE INVENTION

In recent years, multilayer composite films having two, three or four layers have been developed for use as packaging materials for foods and so forth. The composite films are produced by laminating one or more plastic films such as polyethylene, polypropylene, nylon, polyester and polyvinyl chloride films, and a metal foil, such as an aluminum foil. Such materials are in wide use.

For the adhesion of such plastic films or metal foils, use of an adhesive agent prepared by incorporating an oxy acid of phosphorus or a derivative thereof, epoxy resin and a silane coupling agent into a composition containing an organic polyisocyanate and an organic polyol has already been proposed [JPB S61(1986)-4864].

And, use of an adhesive agent prepared by incorporating a polybasic acid anhydride having at least two acid anhydride groups in the molecule into a mixture of an organic polyisocyanate and an organic polymer polyol has also been proposed [JPA S61(1986)-47775].

Further, use of an adhesive agent prepared by incorporating an oxy acid of phosphorus or a derivative thereof, a carboxylic acid compound or its anhydride and epoxy resin into a mixture of an organic polyisocyanate and an organic polyol has also been proposed [JPA H2(1990)-84482].

However, packaging materials produced by using such adhesive agents as mentioned above are not fully satisfactory in bond strength and are disadvantageously insufficient in heat resistance, or chemical resistance such as acid resistance and alkali resistance. For instance, when a package containing a free fatty acid-containing food showing high acidity is retort-sterilized with hot water of a high temperature of at least 135° C. and subjected to a long-term preservation test, it was found that the metal foil-plastic film bond strength decreased and, at the same time, the strength of the packaging material itself decreased. In extreme cases, complete delamination takes place and causes the metal foil to have pinholes, which in turn decreases the air barrier property intrinsic to the metal, thus the intended long-term preservation of foods cannot be achieved.

Furthermore, when vinegar or a highly acidic food with a high free fatty acid content is packaged, the bond strength decreases during the long-term storage even in the absence of a high-temperature sterilization procedure such as boiling or retort, to cause delamination of the plastic film from the metal foil.

OBJECTS OF THE INVENTION

One object of the invention is provide novel polyurethane adhesive compositions.

Another object of the invention is to provide a retort pouch prepared by using the polyurethane adhesive composition.

SUMMARY OF THE INVENTION

The present inventors made various investigations intensively to overcome these drawbacks, and, as a result, found that, by incorporating an oxy acid of phosphorus or a derivative thereof, an amine compound and epoxy resin into an organic polyisocyanate and an organic polyol, a polyurethane adhesive composition superior to conventional ones in adhesive strength, acid-resistance and hot water resistance can be obtained. On the basis of this finding, they have now completed the present invention.

Namely, the present invention relates to a polyurethane adhesive composition comprising an organic polyisocyanate, an organic polyol, an oxy acid of phosphorus or a derivative thereof, an amine compound and epoxy resin.

DETAILED DESCRIPTION OF THE INVENTION

As the organic polyisocyanate component to be used in the practice of this invention, there may be mentioned, among others, aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6-diisocyanato-methyl caprate, cycloaliphatic diisocyanates, such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis (cyclohexyl isocyanate), methyl-2,4-cyclohexane diisocyanate, methyl-2,6-cyclohexane diisocyanate, 1,4-bis(isocyanatomethyl)cyclohexane and 1,3-bis(isocyanatomethyl)cyclohexane, aromatic diisocyanates, such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate or a mixture thereof, 4,4-toluidine diisocyanate, dianisidine diisocyanate and 4,4'-diphenyl ether diisocyanate, aromatic-aliphatic diisocyanates, such as 1,3- or 1,4-xylylene diisocyanate or a mixture thereof, $\omega,\omega'$-diisocyanate-1,4-diethylbenzene and 1,3- or 1,4-bis(isocyanate-1-methyl ethyl) benzene or a mixture thereof, organic triisocyanates, such as triphenylmethane-4, 4',4''-triisocyanate, 1,3,5-triisocyanatebenzene and 2,4,6-triisocyanatetoluene, organic tetraisocyanates, such as 4,4'-diphenyldimethylmethane-2,2'-5,5'-tetraisocyanates, other monomeric polyisocyanates, dimers or trimers or biurets or allophanates derived from the monomeric polyisocyanates mentioned above, 2,4,6-oxadiazinetrione ring-containing polyisocyanates obtainable from carbon dioxide and the above-mentioned monomeric polyisocyanates, products of addition to low-molecular-weight polyols having a molecular weight less than 200, such as ethylene glycol, propylene glycol, butylene glycol, hexylene glycol, neopentyl glycol, 1,6-hexaneglycol, 3-methyl-1,5-pentane diol, 3,3'-dimethylol heptane, cyclohexanedimethanol, diethylene glycol, triethylene glycol, dipropylene glycol, glycerol, trimethylolpropane, pentaerythritol and sorbitol, products of addition to those polyester polyols, polyether polyols, polyesteramide polyols, polycaprolactone polyol, polyvalerolactone polyols, acrylic polyols and polyhydroxyalkanes that have a molecular weight of about 200–200,000 and are to be mentioned later herein in more detail, and products of addition to castor oil.

As the polyol component to be used in the practice of this invention, there may be mentioned those polyol compounds having about 2–6, preferably about 2–4 functional groups, a molecular weight of about 200–200,000, preferably about 300–100,000, more preferably about 300–50,000, and an acid value of about 0–280, preferably about 0–100, more preferably about 0–50 mg KOH/g. More specifically, there may be mentioned polyester polyols, polyether polyols, polyesteramide polyols, acrylic polyols, polyhydroxyalkanes, castor oil, polyurethane polyols, or a mixture of them.

Examples of such polyester polyols include polyester polyols obtainable by allowing a dibasic acid such as terephthalic acid, isophthalic acid, adipic acid, azelaic acid or sebacic acid, dialkyl ester thereof or a mixture thereof to react with glycol such as ethylene glycol, propylene glycol, diethylene glycol, butylene glycol, neopentyl glycol, 1,6-hexane glycol, 3-methyl-1,5-pentane diol, 3,3'-dimethylol heptane, polyoxyethylene diol, polyoxypropylene diol or polytetramethylene ether glycol or a mixture thereof, and polyester polyols obtainable by ring-opening polymerizing lactones such as polycaprolactone, polyvalerolactone or poly (β-mehyl-γ-valerolactone).

Examples of the polyether polyols include polyether polyols obtainable by polymerizing an oxirane compound such as ethylene oxide, propylene oxide, butylene oxide or tetrahydrofuran, using, as an initiator, water or a low-molecular-weight polyol such as ethylene glycol, propylene glycol, trimethylolpropane or glycerol.

Examples of the polyesteramide polyols include those obtainable by combinedly using, in the polyesterification reaction mentioned above, an amino group-containing starting material which is exemplified by an aliphatic amine such as ethylene diamine, propylenediamine or hexamethylenediamine.

Examples of the acrylic polyols include those obtainable by copolymerizing a polymerizable monomer having at least one hydroxyl group in each molecule, such as hydroxyethyl acrylate, hydroxypropyl acrylate or hydroxybutyl acrylate, or a corresponding methacrylate, with acrylic acid or methacrylic acid or an ester thereof.

As the polyhydroxyalkanes, there may be mentioned liquid rubber obtainable by copolymerization with butadiene or butadiene and acrylamide.

The polyurethane polyols are polyols having the urethane bond in one molecule, which can be obtained by allowing a polyether polyol or polyester polyol having a molecular weight of about 200–5,000 to react with an organic polyisocyanate mentioned above at the NCO/OH ratio of less than about 1, preferably not more than about 0.8.

Furthermore, in addition to the polyols mentioned above, a low-molecular-weight polyol having a molecular weight of 62 to 200 may be used additionally for the purpose of adjusting the average molecular weight of the polyol component. Examples of such low-molecular-weight polyols include glycols usable for preparation of polyester polyols, such as ethylene glycol, propylene glycol, butylene glycol, diethylene glycol, dipropytene glycol, hexylene glycol, neopentyl glycol, cyclohexanedimethanol, and polyols such as glycerin, trimethylolpropane and pentaerythritol.

In the practice of this invention, an oxy acid of phosphorus or a derivative thereof, an amine compound and an epoxy resin are incorporated into the adhesive composition consisting of the above-mentioned organic polyisocyanate and organic polyol.

Among the oxy acids of phosphorus and derivatives thereof usable in the practice of this invention, as the oxy acids of phosphorus, any ones having at least one free oxy acid can be used, for example, phosphoric acids such as hypophosphorous acid, phosphorous acid, orthophosphoric acid and hypophosphoric acid, and condensed phosphoric acids such as metaphosphoric acid, pyrophosphoric acid, tripolyphosphoric acid, polyphosphoric acid and ultraphosphoric acid. And, examples of the derivatives of oxy acid of phosphorus include those formed by partial esterification of the above-mentioned oxy acid of phosphorus with alcohols in the state of leaving at least one free oxy acid. Examples of these alcohols include aliphatic alcohols such as methanol, ethanol, ethylene glycol and glycerin, and aromatic alcohols such as phenol, xylenol, hydroquinone, catechol and phloroglycinol. The above-mentioned oxy acids of phosphorus or derivatives thereof may be used either singly or in admixture of two or more of them. The amount of the oxy acid or a derivative thereof to be added ranges from about 0.01 to 10% by weight, preferably from about 0.05 to 5% by weight, more preferably from about 0.1 to 1% by weight, relative to the weight of the whole composition.

As the amine compound to be used in the practice of this invention, any one having one or more of primary, secondary or tertiary amino groups in the molecule may be mentioned. These are exemplified by non-aromatic amines and aromatic amines. Said non-aromatic amines are exemplified by aliphatic amines such as mono (di, tri) butylamine, mono (di, tri) ethanolamine and ethylenediamine, alicyclic amines such as cyclohexylamine, non-aromatic heterocyclic amines such as morpholine, piperidine and piperazine. Said aromatic amines are exemplified by aromatic amines such as aniline, toluidine, anisidine and phenylenediamine, aromatic heterocyclic amines such as pyridine, aminomethylpyridine and imidazole. Aminosilanes such as γ-aminopropyl triethoxysilane and N-β (aminomethyl) γ-aminopropyltriethoxysilane are also used, and these may be used singly or as an admixture of two or more of them. These amine compounds may be contained in a form of chemically bonding to oxiranes such as ethyleneoxide, propyleneoxide and butylene oxide or the epoxy resin described later. The amount of the amine to be added ranges from about 0.01 to 10% by weight, preferably from about 0.05 to 5% by weight, more preferably from about 0.1 to 1% by weight, on the whole composition basis.

The epoxy resin to be used in the practice of this invention is exemplified by reaction products of a polyhydric phenol such as bisphenol A or tetrahydroxydiphenylethane with a polyfunctional halohydrin such as epichlorohydrin, which have a molecular weight of about 320 to 200,000, preferably about 320 to 4,000. The epoxy resin is used in an amount of about 0.1 to 50% by weight, preferably about 1 to 30% by weight, on the whole adhesive composition basis.

For further improving the adhesive properties of the polyurethane adhesive composition of this invention, a carboxylic acid compound or an anhydride thereof and a silane coupling agent may be added, upon necessity.

As the carboxylic acid compound or the anhydride thereof, there may be mentioned any one having one or more carboxyl group in its molecule, which is exemplified by mono or polybasic carboxylic acids such as acetic acid, lactic acid, propionic acid, oleic acid, succinic acid, maleic acid, phthalic acid, pyromellitic acid, benzophenonetetracarboxylic acid, 2,3,6,7-naphthalene tetracarboxylic acid and 5-(2,5-dioxotetrahydrofuryl)-3-methyl-3-cyclohexene-1,2-dicarboxylic acid, or anhydrides thereof. These may be used either singly or in an admixture of two or more of them. These carboxylic acid compounds or their anhydrides may be contained in the composition either in a form chemically bonding to the polyol component or the epoxy resin or as a mere mixture component without chemical bonding. The amount of the carboxylic acid compound or an anhydride thereof to be added ranges from about 0.01 to 20% by weight, preferably from about 0.05 to 10% by weight, more preferably from about 0.1 to 5% by weight, on the whole adhesive composition basis.

And, as the silane coupling agent, any one represented by the structural formula R—Si≡(X)$_3$ or R—Si≡(R')(X)$_2$ (wherein R stands for an organic group having vinyl group, epoxy group, amino group, imino group or mercapto group, R' stands for a lower alkyl group, and X stands for methoxy group, ethoxy group or chlorine atom). Examples of the silane coupling agent include chlorosilane such as vinyl trichlorosilane; aminosilane such as n-(dimethoxymethylsilylpropyl)ethylenediamine and n-(triethoxysilylpropyl)ethylenediamine; epoxysilane such as γ-glycidoxypropyltrimethoxysilane and γ-glycidoxypropyltriethoxysilane; and vinylsilane such as vinyltriethoxysilane. The amount of the silane coupling agent ranges preferably from about 0.1 to 5% by weight on the whole adhesive composition basis.

Furthermore, besides the silane coupling agent, any other additives such as antioxidants, ultraviolet absorbers, hydrolysis preventing agents, antifungal agents, thickening agents, plasticizers, pigments and fillers may be added upon necessity. And, for controlling the curing reaction, conventional catalysts and additives or the like may be used.

While the polyurethane adhesive composition of this invention is used preferably in the form of a two-can type, it can be used in the form of a one-can type.

More specifically, in the case of two-can type, an organic polyisocyanate is used as a curing agent, which is mixed, just prior to use, with the principal component prepared by incorporating the oxy acid of phosphorus or a derivative thereof, an amine compound and an epoxy resin into the polyol component so that the NCO/OH may be in the range from about 0.4 to 10, preferably from about 0.5 to 2.0.

And, in the case of one-can type, the composition is prepared by allowing a mixture of an organic polyol and an epoxy resin to react with an organic polyisocyanate in an excess amount of isocyanate groups relative to hydroxyl groups in the polyol component, then by adding thereto the oxy acid of phosphorus or a derivative thereof and an amine compound. This is a type of curing and causing adhesion by the reaction with water or the moisture in the air. In the manufacture of the one-can type, the reaction of the isocyanate group (NCO) with hydroxyl group (OH) in the polyol and the epoxy resin is conveniently conducted with the ratio of NCO/OH being about 1.2 to 20, preferably in the range from about 1.5 to 10. When the NCO/OH ratio is less than 1.2, the resulting composition has an excessively high viscosity and may cause, in some cases, gelation. When the NCO/OH ratio exceeds 20, the curability becomes poor and, in some instances, no sufficient bond strength can be obtained. Generally, the reaction is carried out at about 30° C. to 100° C., optionally in the presence of an organometal catalyst, a tertiary amine catalyst or the like.

Generally, the two-can type shows a higher curing speed, is superior in adhesion characteristics and has a broader range of application as compared with the one-can type. Although the two-can type has short pot life, it can be used without any trouble when an apparatus is used which can feed the main component and curing agent from separate systems in minimum necessary amounts in a predetermined quantity ratio and mix them just prior to use.

When the adhesive composition of this invention has a viscosity of about 100 to 10,000 cps, preferably about 100 to 5,000 cps at the temperature range of ordinary temperature to 140° C., preferably ordinary temperature to 100° C., said composition can be used without using any solvent.

When the composition has viscosity higher than the above range, said composition, whether it is of the one-can type or of the two-can type, may be diluted with an organic solvent. Any of the organic solvents inert to the isocyanate group, for example esters, such as ethyl acetate, ketones, such as methyl ethyl ketone, and aromatics, such as toluene and xylene, may be used.

In the practical use of the polyurethane adhesive composition of this invention, for example, the adhesive composition is applied onto the film surface by means of a laminator. The composition may be of the solvent type or solventless type. When the composition is of the solvent type, the solvent is allowed to evaporate and the adhesive surface is submitted to lamination. In the case of a solventless type composition, the adhesive surface is directly submitted to lamination. The composition is then cured and hardened at ordinary temperatures or under heating.

The solventless type composition is used generally in a coating amount of about 1.0 to 2.0 g/m$^2$ and the solvent type composition in a coating amount of about 2.0 to 5.0 g/m$^2$.

The adhesive composition of this invention can be cured faster as compared with the conventional urethane adhesives and is superior in adhesive performance. Especially when applied to plastic films, such as polyethylene terephthalate, nylon, polyethylene, polypropylene and polyvinyl chloride films, plastic films metallized with aluminum, silicon oxide, silicon nitride and metals, such as aluminum, stainless steel, iron, copper and lead, said composition can provide very good bond strength, heat resistance, water resistance and chemical resistance.

The polyurethane adhesive composition of this invention, in which an oxy acid of phosphorus or a derivative thereof, an amine compound and an epoxy resin are combinedly used with an adhesive composition consisting of an organic polyisocyanate and an organic polyol, can serve as an adhesive for manufacturing food packaging materials, for instance, giving bonds having very good bonding strength, heat resistance and hot water resistance between a metal foil, such as an aluminum foil, and a plastic film, such as polyethylene, polypropylene, nylon or polyethylene terephthalate film. The food packaging materials obtained by using said composition can be advantageously used as favorable packaging materials showing good resistance to acids and capable of preserving foods stably for a long period, without delamination, i.e. failure of the metal foil-plastic film bond, even when subjected to high temperature hot water sterilization at 135° C. or higher in the state in which the packaging materials are filled with a food and tightly closed.

EXAMPLES

The following examples and comparative examples are further illustrative of the present invention. In the examples, "%" means "% by weight".

Example 1

A mixture of 194.2 g of dimethyl terephthalate, 248.3 g of ethylene glycol and 0.2 g of zinc acetate was subjected to transesterification at 160°–220° C. under nitrogen streams. After distilling off a given volume of methanol, 83.1 g of isophthalic acid was added to the residue. The mixture was subjected to esterification at 200°–220° C. After distilling off a given volume of water, 282.3 g of azelaic acid was added to the residue. The mixture was subjected to esterification at 220°–230° C. The thus esterified product was subjected to condensation for 60 minutes at 220°–230° C., while reducing the pressure gradually, and was further subjected to condensation for 4 hours at 220°–230° C. at 1–2 mmHg to give a polyester glycol having a number average molecular weight of about 15,000. (Polyol A)

A 50 g portion of this Polyol A was dissolved in 67 g of ethyl acetate. To the solution were added 2 g of phthalic anhydride, 0.1 g of phosphoric acid, 0.1 g of morpholine and 15 g of Epikote 1002 (epoxy resin manufactured by Shell Chemical KK) to give Main Component A having a solid content of 50%.

Example 2

To 50 g of Polyol A was added 2 g of maleic anhydride, and the reaction was allowed to proceed for 3 hours at 140° C. The reaction mixture was dissolved in 67 g of ethyl acetate and to this mixture were added 0.1 g of phosphoric acid, 0.15 g of triisopropanolamine and 15 g of Epikote 1002 to give Main Component B having a solid content of 50%.

Example 3

By substantially the same method as used for the preparation of Polyol A, a polyester glycol having a number average molecular weight of 16,000, consisting of isophthalic acid, terephthalic acid, azelaic acid (2/4/5 molar ratio) and ethylene glycol, was prepared. (Polyol B)

To 40 g of this Polyol B was added 0.1 g of succinic anhydride, and the reaction was allowed to proceed at 140° C. for 2 hours. The reaction mixture was dissolved in 75 g of ethyl acetate and to this mixture were then added 0.1 g of phosphoric acid, 0.1 g of morpholine and 10 g of Epikote 1002 to give Main Component C having a solid content of 40%.

Example 4

By substantially the same method as used for the preparation of Polyol A, a polyester glycol having a number average molecular weight of 2,500, consisting of isophthalic acid, sebacic acid (1/1 molar ratio), ethylene glycol and neopentyl glycol (1/3 molar ratio), was prepared. (Polyol C)

A mixture of 100 g of Polyol C, 6.2 g of isophorone diisocyanate, 106.2 g of ethyl acetate and 0.05 g of dibutyltin dilaurate was heated at 65° C. for 7 hours, and to this mixture was then added 0.5 g of diethylene glycol, and the reaction was allowed to proceed for further one hour. To the reaction mixture were then added 0.1 g of phosphoric acid, 0.1 g of dibutylamine, 15 g of Epikote 1002 and 15 g of ethyl acetate to give a polyester urethane type of Main Component D having a solid content of 50%. (Polyol D)

Example 5

To 50 g of Polyol A was added 2 g of succinic anhydride, and the reaction was allowed to proceed for 3 hours at 140° C. The reaction mixture was dissolved in 67 g of ethyl acetate and to this mixture were then added 0.1 g of phosphoric acid, 0.5 g of N,N',N'',N'''-tetra(2-hydroxypropyl)ethylenediamine and 15 g of Epikote 1002 to give Main Component E having a solid content of 50%.

Example 6

In 100 g of ethyl acetate was dissolved 100 g of isophorone diisocyanate trimer whose NCO group content was 17.3% (T 1890/100; manufactured by Hüls Co., Ltd.) to give a solution having a solid content of 50%. Hereinafter, this solution is referred to as "Curing Agent A".

Example 7

Xylylene diisocyanate (188.2 g) was heated to 90° C. and to the heated material was gradually added 44.7 g of trimethylol propane and the reaction was allowed to proceed for 2 hours. The reaction mixture was homogeneously mixed with 77.6 g of ethyl acetate to give a solution of polyisocyanate having a solid content of 75%, an NCO group content of 13.5% and viscosity of 1,800 cps at 25° C. This solution is hereinafter referred to as "Curing Agent B".

Example 8

A mixture of 174.2 g of tolylene diisocyanate, 44.7 g of trimethylol propane and 73.0 g of ethyl acetate was heated at 65° C. for 3 hours to give a solution of polyisocyanate having a solid content of 75%, an NCO content of 14.4% and viscosity of 1,000 cps at 25° C. This solution is hereinafter referred to as "Curing Agent C".

Adhesive compositions 1 to 8 were prepared by compounding Main Components A to E, Curing Agents A to C and a silane coupling agent as indicated in "Table 1" given below.

For comparison, Main Components A' to D' were prepared as shown below. These were partly free of an amine compound, phosphoric acid, a carboxylic acid compound or an anhydride thereof and an epoxy resin, and were compounded as indicated in "Table 2" to give adhesive compositions 51 to 55.

Comparative Examples (1) By the same procedure as in Example (1), Main Component A' having a solid content of 50% eliminating morpholine solely was prepared.

(2) By the same procedure as in Example (2), Main Component B' having a solid content of 50% eliminating maleic anhydride solely was prepared.

(3) By the same procedure as in Example (3), Main Component C' having a solid content of 40%, eliminating phosphoric acid solely was prepared.

(4) By the same procedure as in Example (4), Main Component D' having a solid content of 50%, eliminating epoxy resin solely was prepared.

Laminate films were manufactured by the method to be mentioned later using the respective adhesive compositions defined in [Table 1] and [Table 2]. The respective films were tested for bonding strength between plastic film and aluminum foil, hot water resistance and acid resistance.

The results are shown in [Table 3] and [Table 4].

Manufacture of three-layer laminated film

Laminated film: polyethylene terephthalate film (a thickness of 12 μ)/aluminum foil (a thickness of 9 μ)/unstretched polypropylene (a thickness of 70 μ, corona discharge treatment on the surface).

The above laminated film was manufactured in the following manner. More specifically, each adhesive composition described in [Table 1] was applied onto the polyethylene terephthalate film by means of a laminator at ordinary temperature. Solvents contained in the composition, if any, were evaporated, then the coated surface was laminated with the aluminum foil surface. Then, the adhesive composition was coated to the other side of the aluminum foil of the resultant laminated film. The solvent, if contained in the composition, was evaporated. The coated surface was adhered to the unstretched polypropylene. Thus laminated film was maintained at 50° C. for 3 days for curing the adhesive composition.

Adhesion test

Test specimens, 300 mm×15 mm in size, were cut from the composite film manufactured in the above manner and tested for bond strength on an Instron type tensile tester in the manner of T-peel at a peeling rate of 300 mm/min. Each measured value shown, which is given in terms of the adhesion strength (g/15 mm) between the aluminum foil and the unstretched polypropylene, is an average of five test specimens.

Hot water and acid resistance test

Pouches, 13 cm×17 cm in size, were manufactured using the respective composite films, and packed with vinegar having a concentration of not lower than 4.2% as the content. These pouches were retort-sterilized at 135° C. for 30 minutes under an elevated pressure of 4.5 kg/cm$^2$, and, then, observed for any sign of delamination between the aluminum foil and polypropylene film, tested for peel strength and, after 14 days of storage at 60° C., examined for peeling. In another system, the hot water retort-sterilization was omitted and the pouches were examined for any sign of delamination in the same manner. In each test, 5 pouches were used, and each result shown in each table is the mean value of the corresponding five tests.

From the results of the above tests, it is apparent that the addition of an oxy acid of phosphorus or a derivative thereof, an amine compound and an epoxy resin results in remarkable improvements in the hot water resistance and acid resistance of the adhesive compositions, and, therefore, the adhesive compositions according to the present invention can serve as composite laminate film adhesives in the manufacture of retortable food packaging materials for highly acidic foods.

TABLE 2

Adhesive compositions (Comparative Examples)

| Adhesive No. | Main Component (weight parts) | | | | Curing Agent (weight parts) | | | Silane coupling agent (γ-glycidoxy propyl triethoxy silane) |
|---|---|---|---|---|---|---|---|---|
| | A' | B' | C' | D' | A | B | C | |
| Comparative Examples | | | | | | | | |
| 51 | 100 | | | | 7.5 | | | |
| 52 | 100 | | | | | 7.5 | | |
| 53 | | 100 | | | 7.5 | | | |
| 54 | | | 100 | | 7 | | | |
| 55 | | | | 100 | | | 7.5 | 1 |

TABLE 3

Adhesive Properties (Examples)

| Adhesive No. | Peel strength g/15 mm | Hot water/acid resistance test | | Storage stability | | | |
|---|---|---|---|---|---|---|---|
| | | | | 60° C., one week | | 60° C., two weeks | |
| | | Peel strength g/15 mm | Sign of delamination | After retort sterilizn. | No retort sterilizn. | After retort sterilizn. | No retort sterilizn. |
| Examples | | | | | | | |
| 1 | 1000 | 1050 | No delam. | No delam. | No delam. | No delam. | No delam. |
| 2 | 1100 | 1100 | No delam. | No delam. | No delam. | No delam. | No delam. |
| 3 | 1300 | 1400 | No delam. | No delam. | No delam. | No delam. | No delam. |
| 4 | 1100 | 1100 | No delam. | No delam. | No delam. | No delam. | No delam. |
| 5 | 1050 | 1100 | No delam. | No delam. | No delam. | No delam. | No delam. |
| 6 | 1000 | 1150 | No delam. | No delam. | No delam. | No delam. | No delam. |
| 7 | 1200 | 1400 | No delam. | No delam. | No delam. | No delam. | No delam. |
| 8 | 900 | 1100 | No delam. | No delam. | No delam. | No delam. | No delam. |

TABLE 1

Adhesive Compositions (Examples)

| Adhesive No. | Main Component (weight parts) | | | | | Curing Agent (weight parts) | | | Silane coupling agent (γ-glycidoxy propyl triethoxy silane) |
|---|---|---|---|---|---|---|---|---|---|
| | A | B | C | D | E | A | B | C | |
| Examples | | | | | | | | | |
| 1 | 100 | | | | | 7.5 | | | |
| 2 | 100 | | | | | | 7.5 | | |
| 3 | 100 | | | | | | | 7.5 | 1 |
| 4 | | 100 | | | | 7.5 | | | |
| 5 | | | 100 | | | 7 | | | |
| 6 | | | | 100 | | 7.5 | | | |
| 7 | | | | 100 | | | | 7.5 | 1 |
| 8 | | | | | 100 | 7.5 | | | |

TABLE 4

| | Peel | Hot water/acid resistance test | | Storage stability | | | |
| | | | | 60° C., one week | | 60° C., two weeks | |
| Adhesive No. | strength g/15 mm | Peel strength g/15 mm | Sign of delamination | After retort sterilizn. | No retort sterilizn. | After retort sterilizn. | No retort sterilizn. |
| --- | --- | --- | --- | --- | --- | --- | --- |
| Comparative Examples | | | | | | | |
| 51 | 1100 | 1100 | No delam. | No delam. | No delam. | Partial delam. | Complete delam. |
| 52 | 1050 | 1000 | No delam. | No delam. | No delam. | Partial delam. | Complete delam. |
| 53 | 1000 | 900 | No delam. | Partial delam. | Partial delam. | Complete delam. | Complete delam. |
| 54 | 900 | 200 | Partial delam. | Complete delam. | Complete delam. | Complete delam. | Complete delam. |
| 55 | 1200 | 250 | Partial delam. | Complete delam. | Complete delam. | Complete delam. | Complete delam. |

Adhesive Properties (Comparative Examples)

What is claimed is:

1. In a polyurethane adhesive composition which comprises an organic polyisocyanate and an organic polyol, the improvement wherein the composition also contains by weight based on the weight of the composition (a) from about 0.01 to 10% by weight of an oxy acid of phosphorus or derivative thereof, (b) from about 0.01 to 10% by weight of at least one amine compound selected from the group consisting of ethylenediamine, dibutylamine, diethanolamine, morpholine, piperidine and piperazine or said amine compound in a form chemically bound to an oxirane and (c) from about 0.1 to 50% by weight of an epoxy resin.

2. The polyurethane adhesive composition as claimed in claim 1, which is prepared by incorporating the oxy acid of phosphorus or a derivative thereof, the amine compound and the epoxy resin into an organic polyisocyanate and an organic polyol.

3. The polyurethane adhesive composition as claimed in claim 1, in which the polyol component is further incorporated with the oxy acid of phosphorus or a derivative thereof, the amine compound and the epoxy resin.

4. The polyurethane adhesive composition as claimed in claim 1, which is further incorporated with a carboxylic acid compound or an anhydride thereof.

5. The polyurethane adhesive composition as claimed in claim 1, which is further incorporated with a silane coupling agent.

6. The polyurethane adhesive composition as claimed in claim 1, in which the organic polyisocyanate is an aliphatic polyisocyanate.

7. The polyurethane adhesive composition as claimed in claim 1, in which the organic polyol is a polyester polyol.

8. The polyurethane adhesive composition as claimed in claim 1, in which the oxy acid of phosphorus is a phosphoric acid.

9. The polyurethane adhesive composition as claimed in claim 1, in which the epoxy resin is a reaction product of a polyhydric phenol with a poly-functional halohydrin.

10. The polyurethane adhesive composition as claimed in claim 4, in which the amount of the carboxylic acid compound or anhydride thereof is within the range from 0.01 to 20% by weight on the weight of the whole composition.

11. The polyurethane adhesive composition as claimed in claim 5, in which the amount of the silane coupling agent is within the range from 0.1 to 5% by weight on the weight of the whole composition.

12. A retort pouch prepared by using the polyurethane adhesive composition as claimed in claim 1.

* * * * *